United States Patent [19]
Mizumura et al.

[11] Patent Number: 5,199,395
[45] Date of Patent: Apr. 6, 1993

[54] FOUR-CYCLE ENGINE

[75] Inventors: Sakae Mizumura, Tokyo; Tsunenori Fukumoto, Saitama; Susumu Mizuno, Saitama; Yasuo Shimura, Saitama; Takahiro Kudoh; Jiro Shimizu, both of Tokyo, all of Japan

[73] Assignee: Honda Giken Kogyo Kabushiki Kaisha, Tokyo, Japan

[21] Appl. No.: 773,046

[22] Filed: Oct. 7, 1991

[30] Foreign Application Priority Data

Oct. 18, 1990 [JP] Japan .................................. 2-280151
Nov. 20, 1990 [JP] Japan ............................. 2-120810[U]

[51] Int. Cl.⁵ .................................................. F01M 5/00
[52] U.S. Cl. ......................... 123/196 AB; 123/196 A; 184/6.22; 184/104.1
[58] Field of Search ........ 123/196 R, 196 AB, 196 A; 184/6.22, 104.1

[56] References Cited

U.S. PATENT DOCUMENTS

| | | | |
|---|---|---|---|
| 4,690,236 | 9/1987 | Shinozaki | 184/6.22 |
| 4,813,408 | 3/1989 | Katsumoto | 123/196 AB |
| 4,831,980 | 5/1989 | Nasu et al. | 123/196 AB |
| 4,834,171 | 5/1989 | Larrabee | 123/196 AB |
| 4,995,448 | 2/1991 | Inagaki | 123/196 AB |
| 5,014,775 | 5/1991 | Watanabe | 123/196 AB |

FOREIGN PATENT DOCUMENTS

8302822  8/1983  World Int. Prop. O. ... 123/196 AB

Primary Examiner—E. Rollins Cross
Assistant Examiner—Erick Solis
Attorney, Agent, or Firm—Lyon & Lyon

[57] ABSTRACT

A motorcycle engine having an exhaust passage air introduction system. Each cylinder includes two exhaust passages which are joined at a point displaced from the engine. Air is introduced into one of the exhaust passages of the two so as to more fully combust the unburned gasses within the exhaust passage and then to more fully combust the unburned exhaust in the joined passage. The timing of the valves associated with each exhaust passage is such that the valve associated with the passage having the air inlet has advance timing. A chain tensioner for the timing chain includes a tensioner cylinder hydraulically actuated by the engine oil. A gasket having an orifice therein is positioned between components in the oil passageway extending to the tensioner cylinder. The oil cooling system of the engine includes an oil filter and an oil cooler which are displaced from one another and mounted to a common base which is in turn mounted to the engine. The base includes passageways to direct oil into and out of each of these components.

7 Claims, 12 Drawing Sheets

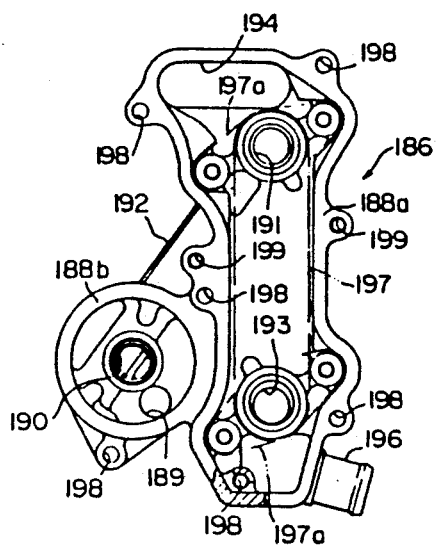
FIG. 13.
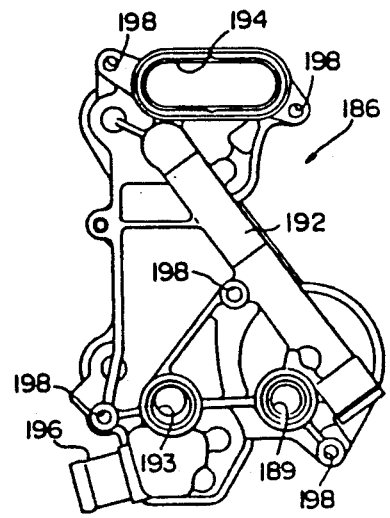
FIG. 14.
FIG. 15.
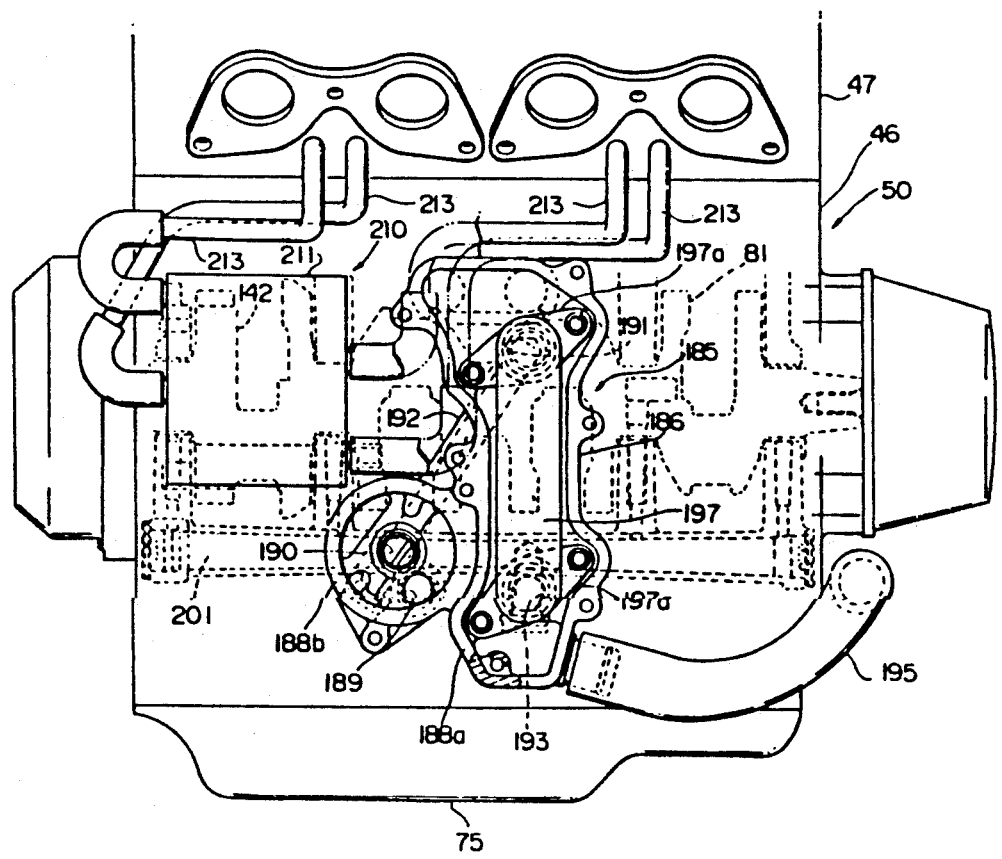

FOUR-CYCLE ENGINE

BACKGROUND OF THE INVENTION

The field of the present invention is four-cycle engines and oil cooling systems thereof.

In the prior art an oil cooling system employing water as the cooling fluid is described in Japanese Utility Model Laid-Open No. 56-105613 (No. 104513/1981). The described system is generally constituted such that engine oil is pumped from an oil pan by an oil pump which operatively connects to the engine crankshaft and is then passed to an oil filter and fed under pressure to an oil cooler mounted integrally with the engine. Engine oil so fed to the oil cooler is thereafter supplied, after cooling to an appropriate temperature, to the several vehicle parts to be lubricated.

Also in the prior art an oil cooling system has been employed on motorcycle engines wherein the oil cooler is mounted on the forward side of the engine to the crankcase. An oil filter is also mounted on the forward side of the engine to the pan. The inlet and outlet passages communicating with the water cooled engine oil cooler are arranged for bypass of a regulated amount of oil from the inlet passage to the outlet passage to enhance the flowability of the cooled oil. Provision is made for a replaceable flow control orifice between the oil inlet and outlet passages to regulate oil viscosity. The location of the oil cooler and the oil filter at separate locations on the forward side of the engine provide for air flow past these components during movement of the vehicle to assist in the cooling effects. Reference is made to U.S. Pat. No. 4,995,448, the disclosure of which is incorporated herein by reference.

Some four-cycle engines for automobiles and motorcycles are provided with an exhaust emission control device, which supplies secondary air to the exhaust gas immediately after the same has been discharged to make the unburned gas contained in the exhaust gas burn (to be oxidized) so that the emission of the unburned gas is reduced to the lest extent.

Such an engine has previously been proposed by the applicant of the present application in Japanese Patent Laid-Open (Kokai) No. S 60-164617.

This known engine is provided with two exhaust ports provided respectively with exhaust valves for each cylinder. A secondary air feed passage is connected to one of the exhaust passages extending from the exhaust ports. Secondary air is sucked through the secondary air feed passage into the exhaust passage by the agency of a negative pressure produced by the exhaust gas flowing through the same exhaust passage. The unburned gas contained in the exhaust gas is caused to burn (to be oxidized) by the secondary air to promote controlling the exhaust emission. The exhaust passages connected respectively tot he exhaust ports are gathered at a gathering part.

When such a secondary air supply structure is employed, the unburned gas contained in the exhaust gas flowing through the other exhaust passage to which secondary air is not supplied mixes with the secondary air after passing the gathering part, and then the unburned gas is able to burn. However, since the temperature of the exhaust gas at a position after the gathering part is lower than that immediately after the same has been discharged through the exhaust port, the unburned gas is unable to burn satisfactorily and, consequently, it is highly possible that the exhaust gas having a large unburned gas content is emitted. It is also possible that the unburned gas flowing through the exhaust passage to which secondary air is not supplied does not burn satisfactorily until the temperature of the exhaust port is increased by the burning of the unburned gas in the exhaust passage to which secondary air is supplied.

A hydraulic chain tensioner, in general, applies pressure to a chain with a plunger which is biased by oil fed thereto under pressure from a lubricating circuit. In most cases, the flow rate of the oil flowing into the chain tensioner is very small. However, it is impossible to form an oil feed passage having a very small diameter because of machining difficulties. Therefore, an orifice and a leak mechanism are provided in the oil feed passage to reduce the working pressure. Such a technique is disclosed in Japanese Utility Model Laid-Open (Kokai) No. S 59-110459.

A member provided with an orifice employed in the prior art must be fabricated separately from the tensioner cylinder of the hydraulic chain tensioner and must be provided with a minute hole, and the leak groove has a complicated construction. Therefore, the member provided with the orifice is costly.

SUMMARY OF THE INVENTION

The present invention is directed to a motorcycle engine which is water cooled and includes a water cooled oil cooling unit and an oil filter. These elements are mounted to a base affixed to the engine. In specific features of the present invention, the base includes passageways for conveying oil to and from these units.

In another aspect of the present invention, an oil feed passage includes a gasket having an orifice which is arranged to restrict flow to a tensioner cylinder on a hydraulic chain tensioner. The gasket may have a laminated construction consisting of at least two layered sheets, one of the sheets being provided with an opening having a very small diameter and serving as the orifice. The other sheet may be provided with a leak groove allowing the oil to leak into the engine case. The orifice and the leak groove can be formed in the conventional gasket inserted between joining surfaces of the engine case and the hydraulic tensioner.

Accordingly, it is an object of the present invention to provide improved oil systems in a motorcycle engine. Other and further objects and advantages will appear hereinafter.

BRIEF DESCRIPTION OF THE DRAWINGS

FIG. 13 is a front view of the body of the cooling case.

FIG. 14 is a rear view of the body of FIG. 13.

FIG. 15 is a front view of a lower portion of the engine.

DETAILED DESCRIPTION OF THE PREFERRED EMBODIMENT

Figure 4:
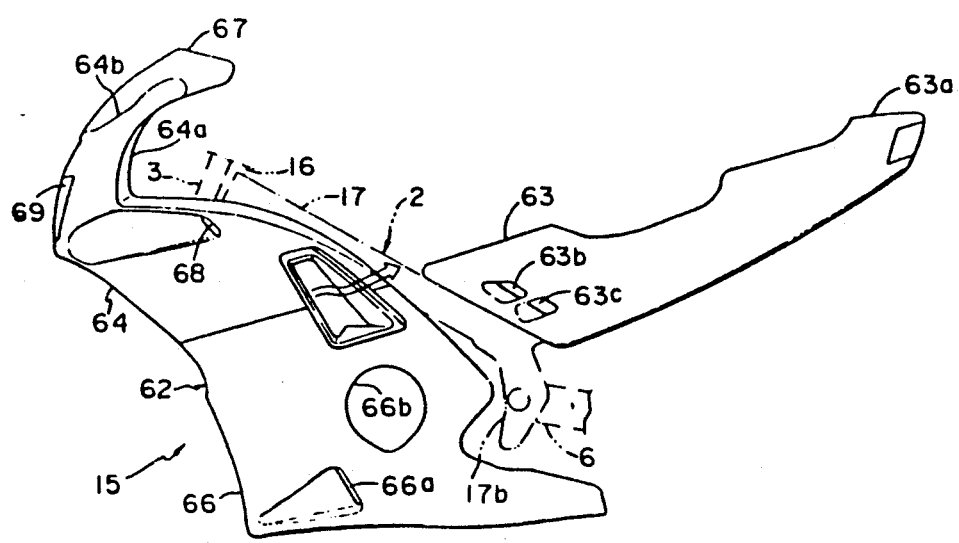
FIG. 4 is a side view of the fairings of the motorcycle.

The motorcycle 1 comprises a main frame 2, front fork 3 having a pair of legs, a bar handle 4 attached for steering to the upper end of the front fork 3, a front wheel 5 journaled on the front fork 3, a rear fork 6 pivotally joined to the main frame 2, a rear wheel 7 journaled on the rear fork 6, a water-cooled four-cycle engine 8 embodying the present invention, supported on the main frame 2, a radiator 9 supported on the main frame 2, a fuel tank 10 mounted on top of the main frame 2, a seat 11 on which the driver and the passenger are to be seated disposed behind the fuel tank 10, driver's steps 12, passenger's steps 13, and a foldable stand 14 for supporting the body in an upright position in parking the motorcycle 1. The body of the motorcycle 1 is covered substantially entirely with a cowl 15 shown in FIG. 4.

The main frame 2 comprises: a head tube 16 disposed at the front end; a pair of hollow main frame members 17 having a rectangular cross section, extending respectively along the right and left sides of the body and declining toward the rear from the head tube 16, and provided integrally with front engine hangers 17a and rear engine hangers 17b projecting downward therefrom; gusset pipes 18 interconnecting the head tube 16 and the front engine hangers 17a; and a seat rail 19 consisting of a pair of upper rails 19a having front ends joined to the rear ends of the main frame members 17 and rear ends welded together, and extending obliquely upward from the rear ends of the main frame members 17, and a lower rail 19b. A battery D is disposed in a space under the seat 11 in the front portion of the sheet rail 19.

The driver's step 12 is supported on step brackets 20 fixed to the rear engine hangers 17b, the passenger's steps 13 are supported on step brackets 21 fixed to the lower seat rail 19b, and the stand 14 is joined to the rear engine hangers 17b.

A steering stem, not shown, provided integrally with a lower bridge 22 at its lower end is journaled for rotation about its own axis in the head tube 16 of the main frame 2, and a top bridge 23 is fixed to the upper end of the steering stem projecting from the head tube 16.

The front fork 3 comprises bottom cases 24, and inner tubes 25 inserted for telescopic movement in the bottom cases 24 and combined with the bottom cases 24 by shock absorbers, not shown, respectively. The opposite ends of the inner tubes 25 are fixed to the opposite ends of the top bridge 23 and the lower bridge 22, respectively. Thus, the front fork 3 is joined to the steering stem by means of the lower bridge 22 and the upper bridge 23 for turning about the axis of the steering stem.

The bar handle 4 consists of a pair of bars having inner ends fixedly put on the upper end of the front fork 3 projecting from the top bridge 23.

The front wheel 5 has a wheel 26, a ire 27 fitting the outer circumference of the rim of the wheel 26, and an axle 26a coaxially journaled on the hub of the wheel 26. The opposite ends of the axle 26a are attached to the lower ends of the bottom cases 24 of the front fork 3. A front fender 28 is held on the bottom cases 24 of the front fork 3. A front fender 28 is held on the bottom cases 24 so as to cover the upper half of the front wheel 5.

A disk brake unit 29 comprises rotors 30 coaxially and fixedly attached respectively to the opposite sides of the wheel 26, stays 31 attached respectively to the back sides of the bottom cases 24 of the front fork 3, caliper assemblies 32 fixed respectively to the stays 31 to brake the motorcycle 1 by pressing friction pads to the rotors 30, and a brake lever 33 supported on the right-hand bar of the bar brake 4 to operate the caliper assemblies 32 for braking.

The rear fork 6 has a base end 34 at its front end, and a pair of chain stays 35 extending backward from the base end 34. The rear fork 6 is supported pivotally at the base end 34 on a pivot 36 held on the rear engine hangers 17b attached to the main frame member 17 so that the rear fork 6 is able to swing on the pivot 36 in a vertical plane. A rear fender 37 for covering the upper front portions of the rear wheel 17, and a triangular plates 35a are formed in an integral part by molding a resin. The triangular plates 35a are fastened to the upper sides of the chain stays 35.

The rear wheel 7 is somewhat greater in diameter than the front wheel 5. The rear wheel 7, similarly to the front wheel 5, has a wheel 38, a tire 39 fitting the outer circumference of the rim the wheel 38, and an axle Aaa coaxially journaled on the hub of tee wheel 38. The axle 38a is supported at its opposite ends on the rear ends of the chain stays 35 of the rear form 6 so that the rear wheel 7 swings together with the rear fork 6.

shocks applied to the rear wheel 7 by the road surface is absorbed by a rear shock absorbing unit 40. The rear shock absorbing unit 40 comprises, in combination, a shock absorber 41 consisting of a dashpot 41a, a spring 41b and associated parts, and having an upper end joined pivotally with a pin to a cross member, not shown, fixed at its opposite ends to the main frame members 17, a first link 42 having one end pivotally joined to the lower end of the shock absorber 41, a second link 43 having one end pivotally joined to the other end of the first link 42 and the other end pivotally joined to a cross member, not shown, extended between the rear engine hangers 17b.

The rear wheel 7 is provided with ar ear disk brake unit comprising rotors, caliper assemblies and associated parts. The rear disk brake unit is similar to the front disk brake unit 29 provided on the front wheel 5 and hence the description thereof will be omitted.

A sprocket 44 is attached to the left end surface of the hub of the wheel 38 of the rear wheel 7 coaxially with the wheel 38, and a driving chain 45, which will be described later, is wound around the sprocket 44.

Figure 5:
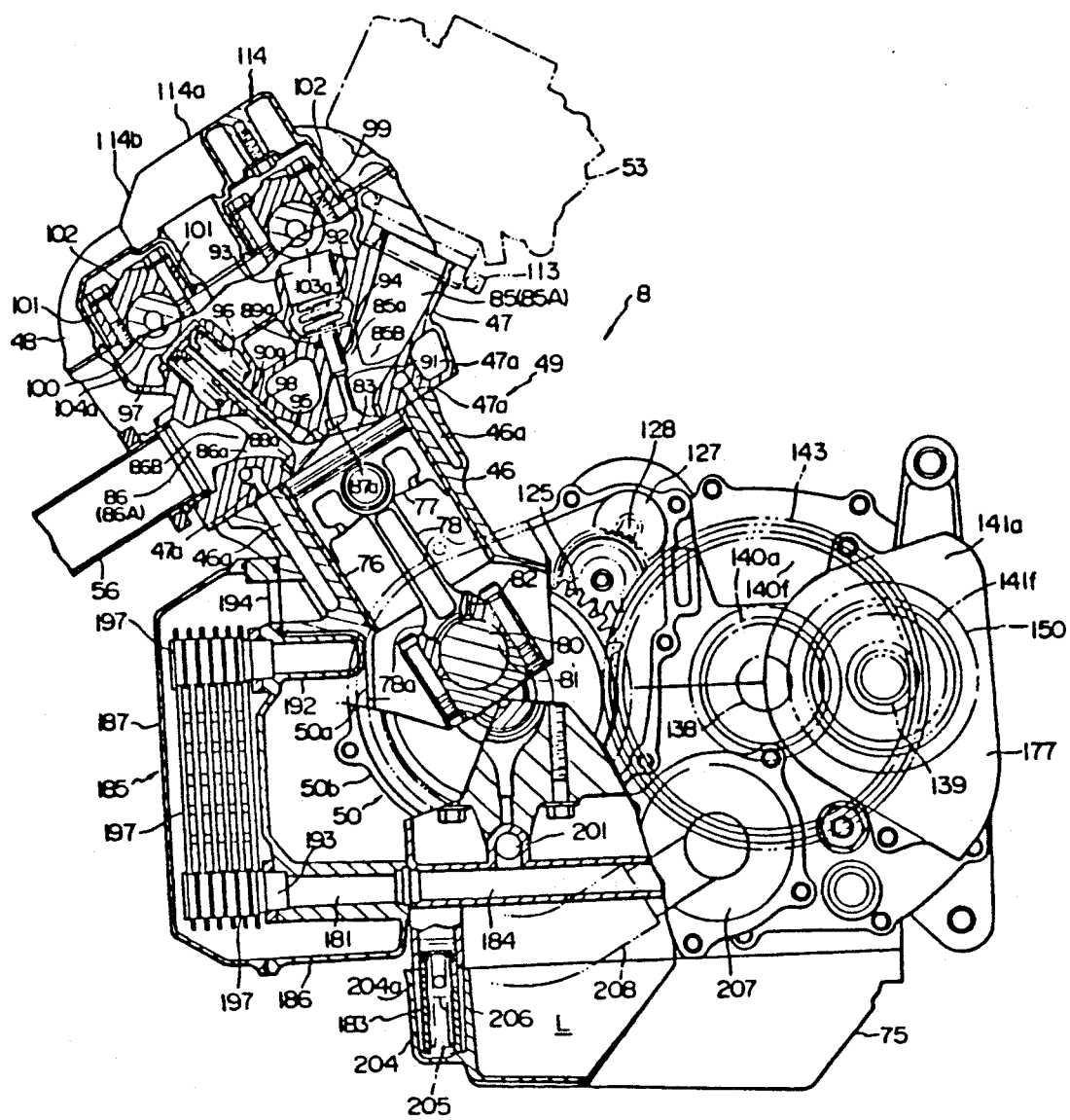
FIG. 5 is a cross-sectional side view of the engine of the motorcycle.
Figure 6:
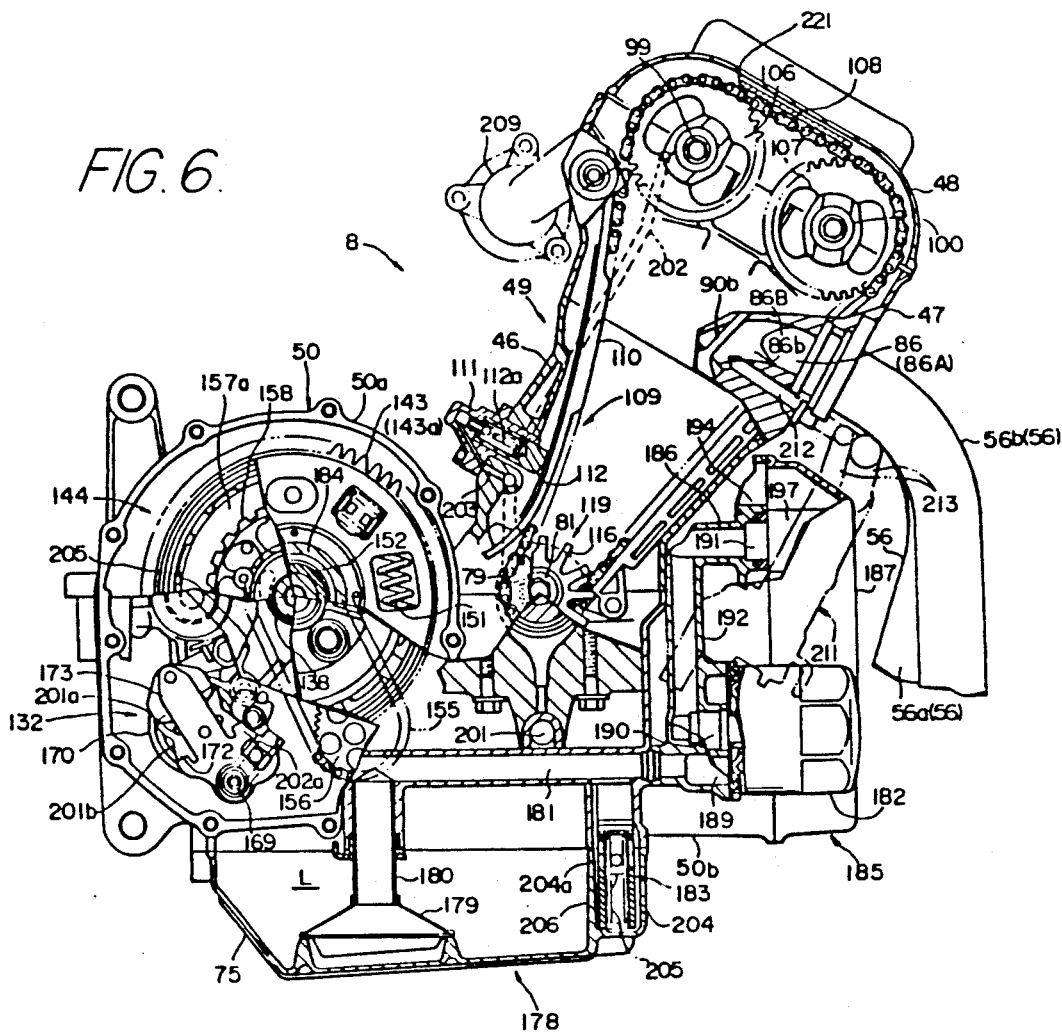
FIG. 6 is a cross-sectional side view of the engine of the motorcycle taken on the opposite direction from that of FIG. 5.
Figure 7:
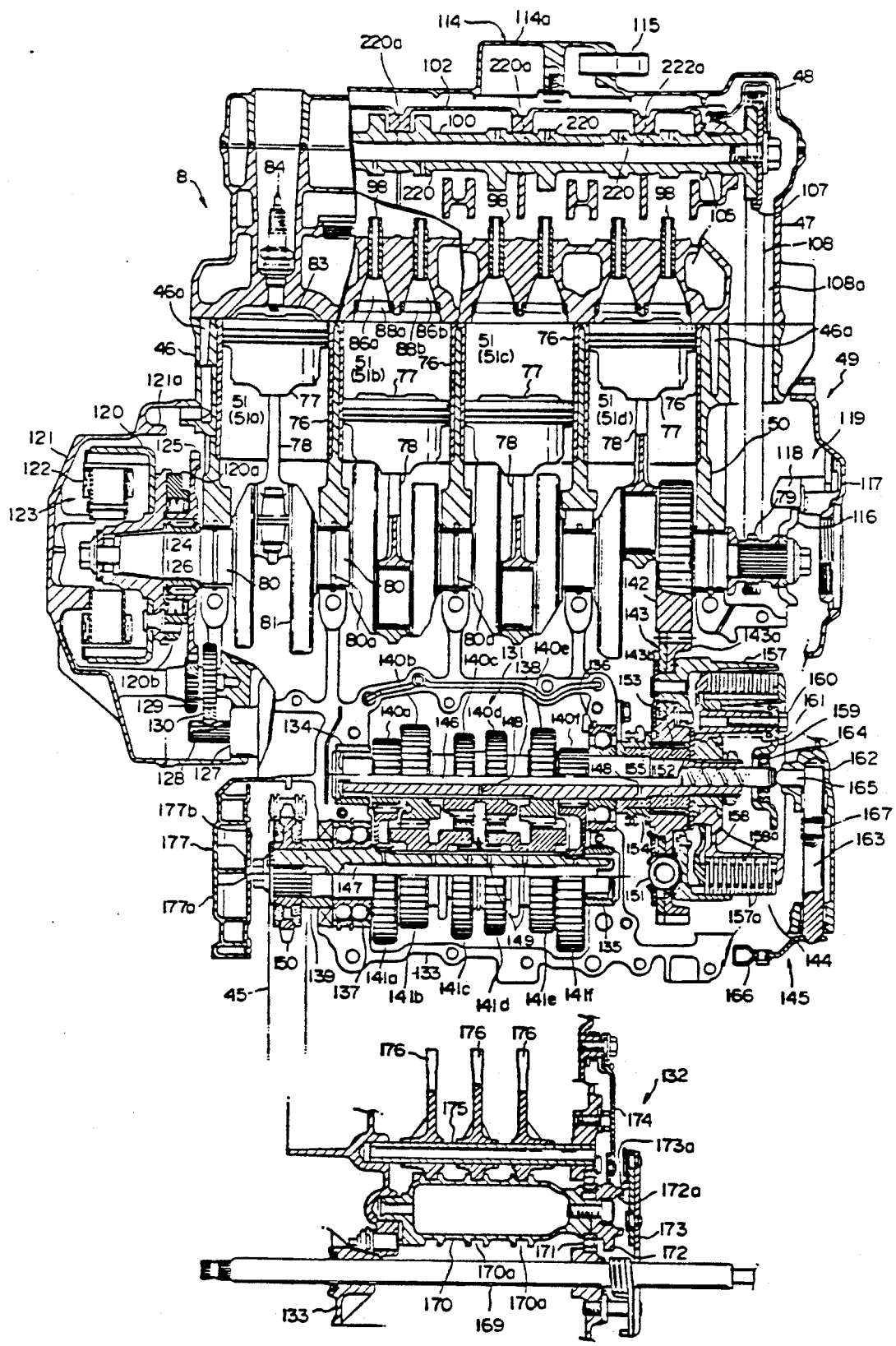
FIG. 7 is a cross-sectional view taken through the centers of rotation of the engine of the motorcycle.

Referring to FIGS. 5 to 7, the engine 8 is a parallel four-cylinder four-cycle engine having a cylinder block assembly 49 comprising a cylinder block 46, a cylinder head 47 and a cylinder head cover 48, and a crankcase 50 joined to the lower end of the cylinder head assembly 49. The cylinder block 46 of the cylinder block assembly 49 is provided with four cylinders 51 in a lateral arrangement. The cylinder block assembly 49 is tilted to the front at a small angle. The engine 8 is supported on the main frame 2 by fastening a front portion of the cylinder block assembly 49 to the front engine hangers 17a of the main frame members 17 with bolts, fixedly connecting a rear portion of the cylinder block assembly 49 by stays 52 to the main frame members 17 and fastening the rear end of the crankcase 50 to the rear engine hangers 17b with bolts.

A carburetor 53 for feeding a mixture into the cylinder block assembly 49 by the suction of the engine 8 is connected to the rear portion of the cylinder block assembly 49 of the engine 8. An air cleaner 54 is connected to the carburetor 53. The air cleaner 54 is placed in a recess 10a formed in the front portion of the lower surface of the fuel tank 10. An intake pipe 55 bending downward is connected to the front side (inlet side) of the air cleaner 54, and the intake mount 53a of the carburetor 53 is inserted in the rear side of the air cleaner 54.

Figure 2:
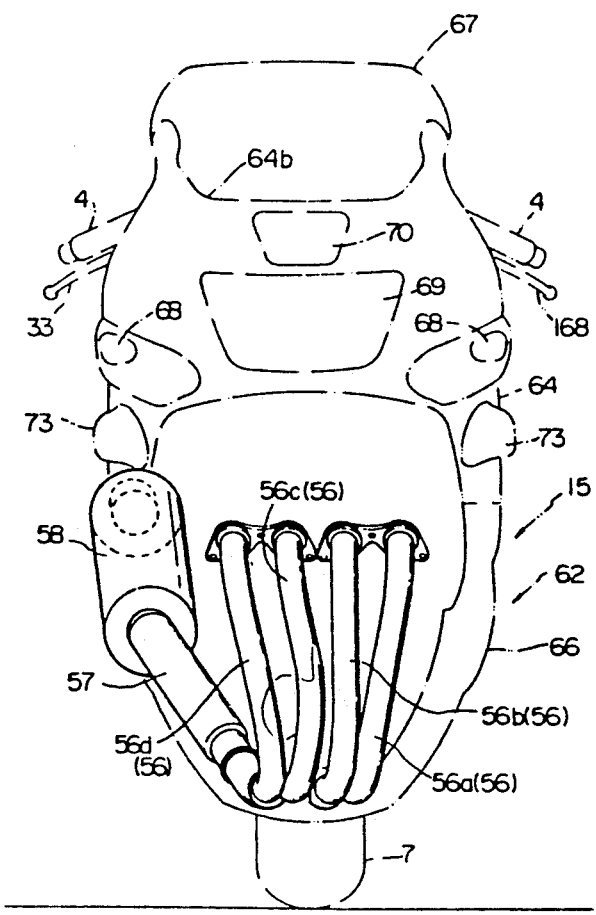
FIG. 2 is a front view of the exhaust system of the motorcycle.
Figure 3:
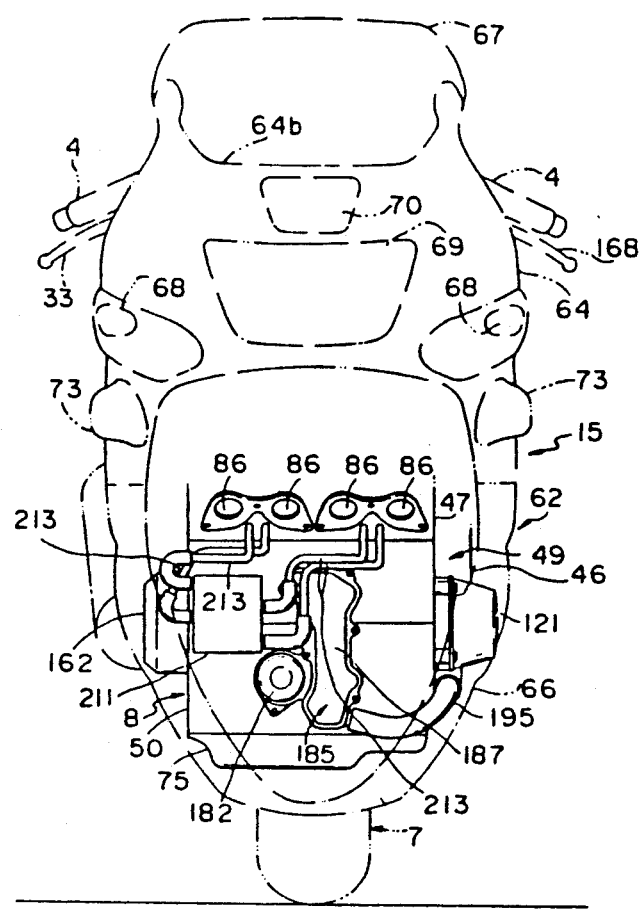
FIG. 3 is a front view of portions of the engine assembly of the motorcycle.

Exhaust pipes 56 for the cylinders 51 are connected to the front side of the cylinder block assembly 49. As shown in FIG. 2, the four exhaust pipes, namely, a first exhaust pipe 56a, a second exhaust pipe 56b, a third exhaust pipe 56c and a fourth exhaust pipe 56d from left to right, extend downward along the front side of the engine 8, are gathered under the engine 8, extend backward along the lower surface of the crankcase 50, and are connected to a single collecting pipe 57 under the rear end of the crankcase 50. The collecting pipe 57 is bent obliquely to the right and inclined upward toward the rear along the right side of the rear wheel 7. A tubular muffler 58 is joined to the rear end of the collecting pipe 57 so as to be inclined upward toward the rear.

The engine 8 will be described later in detail.

The radiator 9 is of a cross flow type having a laterally elongate rectangular shape. The radiator 9 has a radiator core, not shown, an inlet tank, not shown, connected to the right end of the radiator core and an outlet tank 9a connected to the left end of the radiator core. The radiator 9 is disposed in front of the engine 8 and held by the front engine hangers 17a and the gusset pipes 18 in a slightly forwardly tilted position. A radiator fan 9A for cooling the radiator 9 is disposed behind the radiator 9. An electric horn 59 is disposed in front of the radiator 9. The electric horn 59 is supported on stays 60 and 61 fixed to the front engine hangers 17a.

Referring to FIGS. 1 to 4, the cowl 15 comprises a front cowl 62 covering the front portion of the body and an upper portion extending along the main frame members 17, and a rear cowl 63 covering the rear portion of the body under the fuel tank 10 and the seat 11. the front cowl 62 can be dived into an upper cowl 64, a middle cowl 65 and an under cowl 66.

The upper cowl 64 of the front cowl 62 is formed by molding in a streamline shape and extends backward from a position in front of the head tube 16 along the opposite sides of the upper portion of the front fork 3, the radiator 9 and the cylinder head assembly 49 of the engine 8. Recesses 64a are formed in the opposite sides of the front portion of the upper cowl 64 to allow the steering movement of the bar handle 4. A substantially U-shaped recess 64b is formed in the upper end of the front portion of the upper cowl 64 and a curviform, transparent screen 67 is nested integrally in the U-shaped recess 64b. The screen 67 extends to a position substantially above the bar handle 4 and covers the front fork 3 from above the same. The upper cowl 64 is held at its front end by a cowl stay, not shown, and the side portions of the same are fastened with bolts to the main frame members 17 and the front engine hangers 17a.

As best shown in FIG. 2, air inlet openings 68 are formed in the right and left portions of the front surface of the upper cowl 64 to introduce air into the radiator 9. A head lamp 69 is disposed in the middle portion of the front surface of the upper cowl 64 between the air inlet openings 68. Another air inlet opening is formed in the upper cowl 64 at a position above the head lamp 69. A meter unit 71 including a speed meter and an engine speed meter is disposed behind the upper cowl 64 at a position above the head lamp 69. A meter unit 71 including a speed meter and an engine speed meter is disposed behind the upper cowl 64 and is held on a stay 72 fixed to the head tube 16. Turn indicators 73 are attached to the upper crown 64 at positions below the air inlet openings 68, respectively.

The middle cowl 65 of the front cowl 62 has a shape conforming to the shape of a recess 64c formed in the rear portion of the upper cowl 64. The middle cowl 65 is fastened to the upper cowl 64 and the under cowl 66 with bolts. Air outlet openings 65a are formed in the front end of the middle cowl 65 at positions on the opposite sides of a position behind the engine 8 to allow air introduced into the cowl 15 to flow outside.

The under cowl 66 of the front cowl 62 has a substantially U-shaped cross section and extends from the lower end of the upper cowl 64 so as to cover the opposite sides of the crankcase 50 of the engine 8, and the exhaust pipes 56. The under cowl 66 is fastened to the main frame member 17 with bolts. Air inlet openings 66a are formed in the lower front portion of the under cowl 66 to intrude air into the interior of the cowl 15 during running.

The rear cowl 63 covers the opposite sides of the seat rail 19 consisting of the two upper rails 19a and the lower rail 19b, and has a tail portion 63a of covering the rear portion of the seat 11. The rear cowl 63 is fastened to the rails 19a and 19b with fastening means, such as hooks. A rear fender 74 for covering the upper rear portion of the rear wheel 7 is attached to the rear end of the rear cowl 63. Two air outlet openings 63a and 63c are formed in the front portion of the rear cowl 63 to allow air to flow outside.

The engine 8 will be described in detail with reference to FIGS. 5 to 10.

As mentioned above, the engine 8 has a cylinder block assembly 49 consisting of the cylinder block 46, the cylinder head 47 and the cylinder head cover 48, and a crankcase 50. The crankcase 50 is assembled by separably joining together an upper case 50a and a lower case 50b. The upper case 50a and the cylinder block 46 are formed integrally by casting. An oil pan 75 is fastened to the lower surface of the lower case 50b.

Figure 27:
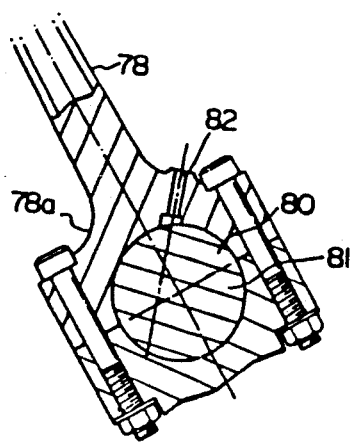
FIG. 27 is a sectional side view of the crankshaft end of a connecting rod.

As shown in FIG. 7, the cylinder block assembly 49 is provided with the parallel four cylinders 51. Cylinder sleeves 76 are inserted in the cylinders 51 and combined with the cylinder block 46 by insert molding. Pistons 77 are fitted in the cylinder sleeves 76 for sliding reciprocation therein. The pistons 77 are connected to a crankshaft 81 by connecting rods 78, respectively. The crankshaft 81 is journaled on the crankcase 50. The journals 80 of the crankshaft 81 are provided respectively with oil grooves 81a. A crankshaft sprocket 79 is mounted on the right end of the crankshaft 81. The pistons 77 reciprocates within the cylinder 51 to rotate the crankshaft 81. As shown in FIG. 5, each connecting rod 78 is provided with an oil spit hole 82 to spit the lubricating oil flowing through the oil groove 80a to the lower surface of the piston 77. As shown in FIG. 27, the oil spit hole 82 extends through the bid end 78a of the connecting rod 78 along a straight line extending across a position dislocated toward the piston 77 from the center axis of the bid end 78a.

As shown in FIG. 5, the cylinder head 47 is provided with cavities to define combustion chambers 83 together with the top ends of the corresponding pistons 77 when the pistons 77 reach the top dead center. Ignition plugs 84 are screwed in the cylinder head 47 so that their extremities are located respectively in the combustion chambers 83. Intake passages 85 and exhaust passages 86 are formed so as to connect he combustion chambers 83 to the outside.

Figure 9:
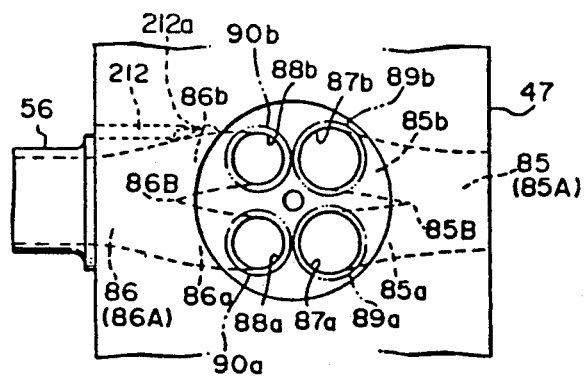
FIG. 9 is a bottom view of a portion of the cylinder head of the engine.

As shown in FIG. 9, each intake passage 85 for each cylinder 51 consists of a main intake passage 85A and two branch intake passages 85a and 85b branching at a branching portion 85B. The branch intake passages 85a and 85b opens in to the combustion chamber 83 respectively at two intake ports 87a and 87b.

Each combustion chamber 83 is provided with two exhaust ports 88a and 88b. Each exhaust passage 86 consists of a main exhaust passage 86A, and two branch exhaust passages 86a and 86b opening respectively into the exhaust ports 88a and 88b of the combustion chamber 83.

Figure 8:
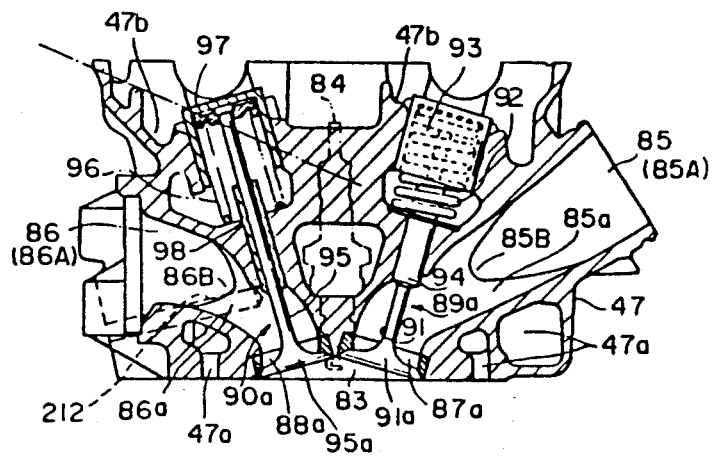
FIG. 8 is a cross-sectional view of the head of the engine illustrating an intake passage and an exhaust passage.

As shown in FIGS. 8 ad 9, the cylinder head 47 is provided with intake valves 89a and 89b for closing the intake ports 87a and 87b, and exhaust valves 90a and 90b for closing the exhaust ports 88a and 88b.

As shown in FIG. 8, each intake valve 89a (89b) has a mushroom-shaped valve element 91a to be seated on a valve seat formed in the edge of the intake port 87a (87b), a valve step 91, a valve spring 92 biasing the valve stem 91 upward so that the valve element 91a is seated on the valve seat formed in the edge of the intake port 87a (87b) to close the latter, and a tubular valve lifter 93 connected to the upper end of the valve stem 91. The valve step 91 is inserted slidably in a valve guide 94 fitted in the cylinder head 47.

The exhaust valves 90a and 90b are similar in construction to the intake valves 89a and 89b. Each exhaust valve 90a (90b) has a valve element 95a, a valve stem 95, a valve spring 96, a valve lifter 97 and a valve guide 98.

An intake camshaft 99 for controlling the intake valves 89a and 89b, and an exhaust camshaft 100 for controlling the exhaust valves 90a and 90b are journaled on the cylinder head 47 in parallel to the crankshaft 81.

The camshafts 99 and 100 are hollow shafts which are held in place for rotation on the cylinder head 47 by bearing caps 102 fixed to the cylinder head 47 with bolts 101. The intake camshaft 99 is provided integrally with intake cams 103a and 103b respectively for controlling the intake valves 89a and 89b, and the exhaust camshaft 100 is provided integrally with exhaust cams 104a and 104b respectively for controlling the exhaust valves 90a and 90b. Each of the camshafts 99 and 100 is provided integrally at its right end with an annular ridge 105, which engages the bearing cap 102 to restrain the corresponding camshafts from axial movement. The bores of the camshafts 99 and 100 serve as oil passages. Oil holes 220 are formed in the base surfaces of the cams 103a, 103b, 104a and 104b so as to open into the bores of the camshafts 99 and 100, and oil holes are formed in the journals of the camshafts 99 and 100 so as to open into the bores of the camshafts 99 and 100.

Camshaft sprockets 106 and 107 are fixed to the right ends of the camshafts 99 and 100, respectively. A camshaft driving chain 108 is extended around the camshaft sprockets 106 and 107 and the crankshaft sprocket 7 fixed to the crankshaft 81 to drive the camshafts 99 and 100 for rotation by the crankshaft 81.

As the camshafts 99 and 100 are rotated, the intake cams 103a and 103b and the exhaust cams 104a and 104b in sliding contact with the valve lifters 93 and 97 of the corresponding intake valves 89a and 89b and the corresponding exhaust valves 90a and 90b drive the corresponding valve stems 91 and 95 for axial reciprocation to open and close the intake ports 87a and 87b, and the exhaust ports 88a and 88b.

Figure 10:
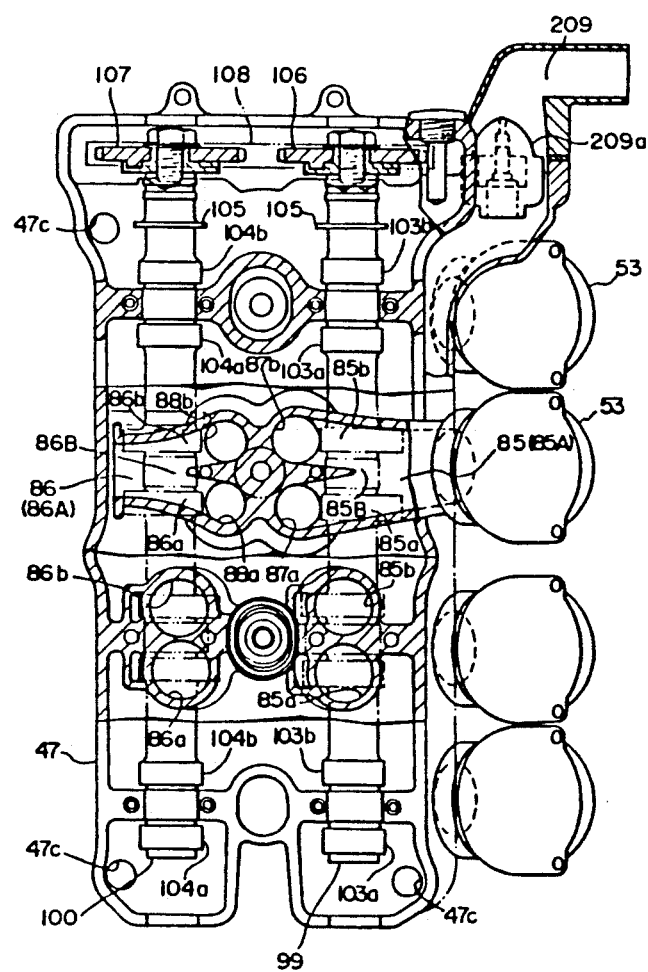
FIG. 10 is top sectional view taken at different levels through the head of the engine.

A shown in FIG. 8, oil receivers 47b are formed in the cylinder head 47 around the valve lifters 93 and 97 to lubricate the contact surfaces of the valve lifters 93 and 97, and the corresponding cams 103a, 103b, 104a and 104b by the lubricating oil contained therein when the valve lifters 93 and 97 are depressed. In FIG. 8, an alternate long and short dash line indicates a horizontal line relative to the engine 8 mounted on the body (main frame 2). As best shown in FIG. 10, oil return holes 47c are formed in the opposite ends of the cylinder head 47 to return the lubricating oil to the oil pan 75.

As shown in FIG. 6, a chain tensioner 109 is disposed so as to engage a portion of the camshaft driving chain 108 extending between the camshaft sprocket 106 fixed to the intake camshaft 99 and the crankshaft sprocket 79 to suppress the vibration of the camshaft driving chain 108.

The chain tensioner 109 comprises a tension slipper 110 having one end pivotally supported on the cylinder head 47 and extended along the camshaft driving chain 108, a cylinder 111 fixed to the cylinder block 46, and a plunger 112 internally provided with a float 112a and axially slidably fitted in the cylinder 111 so as to press the tension slipper 110 against the camshaft driving chain 108.

As shown in FIG. 6, a chain guide 221 is attached to the cylinder head cover 48 so as to extend along the outer side of a portion of the camshaft driving chain 108 extending between the camshaft sprockets 106 and 107.

As shown in FIG. 5, the carburetor 53 is connected through a carburetor insulator 113 to the open end of the intake passage 85 (main intake passage 85A). The connecting end of the exhaust pipe 56 is connected to the open end of the exhaust passage 86 (main exhaust passage 86A).

Figure 1:
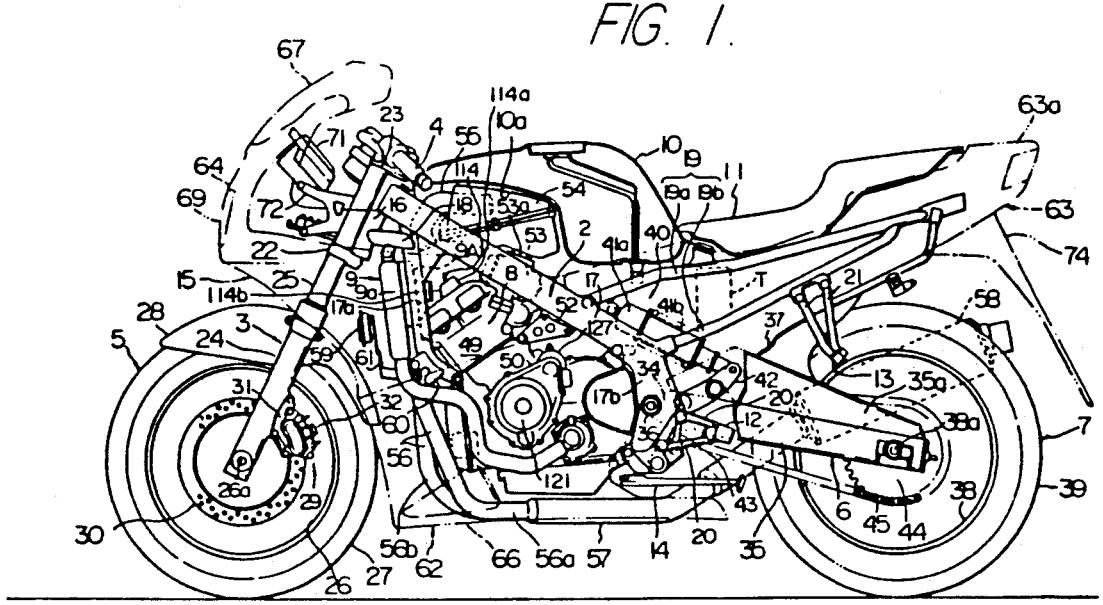
FIG. 1 is a side view of a motorcycle employing the present invention.

The cylinder head cover 48 joined to the upper end of the cylinder head 47 is provided with a breather chamber 114 communicating with the interior of the crankcase 50 by means of the interior of the cylinder head cover 48, and the camshaft driving chain chamber 108a in which the camshaft driving chain 108 extends to separate oil contained in blowby gas, i.e., the exhaust gas leaked into the crankcase 50, from the same. The breather chamber 114 is formed in a breather case 114a attached to the cylinder head over 48. The blowby gas is discharged through a pipe 115 connected to the breather chamber 114 into the atmosphere after separating the oil. The front end of the breather case 114a is cut in a inclined surface 114b as shown in FIGS. 1 and 5 to provide a space for the radiator fan 9A.

As shown in FIG. 6 and 7, a pulse generating rotor 116 is fixed to the right end of the crankshaft 81 for rotation together with the crankshaft 81, and a pulse generator 118 is held on a pulse generator cover 117 joined to the crankcase 50 to form an ignition point detecting mechanism.

An ac generator 123 is disposed near the left end of the crankshaft 81. The ac generator 123 has a rotor 120 fixed to the left end of the crankshaft 81 for rotation together with the same, and a stator 122 held on a generator cover 121 joined to the crankcase 50. The generator cover 121 protrudes outside slightly through a circular opening 66b (FIG. 4) formed in the under cowl 66 of the front cowl 62. The upper portion of a space in the generator cover 123 communicates with an oil passage 46b formed in the cylinder block 46. The lubricating oil flows through he oil passage 46b and along a guide rib 121a formed on the inner surface of the generator cover 121 to lubricate the sliding surfaces of the ac generator cover 123.

A driven sprocket 125 is supported by a needle bearing 124 on the crankshaft 81 at a position inside the ac generator 123. The driven sprocket 125 is interlocked by an overrunning clutch 126 with the inner circumference of a ring 120a fixed to the rotor 120. The driven sprocket 125 is interlocked also through gears 129 and 130 with the driving shaft 128 of a starting motor 127 disposed in the left end of the upper case 50a of the crankcase 50. The ring 120a is provided with a plurality of oil holes 120b, only one of them is shown in FIG. 7, arranged at equal angular intervals.

A transmission 131 combined with the engine 8, and a shifting mechanism 132 for controlling the transmission 131 will be described hereinafter.

Referring to FIG. 7, the transmission 131 comprises a gear case 133 formed integrally with the lower case 50b of the crankcase 50, a hollow, splined main shaft 138 and a hollow splined countershaft 139 extended in parallel to the crankshaft 81 and supported in needle bearings 134 and 135 and ball bearings 136 and 137 on the gear case 133, gears 140a to 140f mounted on the main shaft 138, gears 141a to 141f mounted on the counter shaft 139 so as to engage the corresponding gears 140a to 140f, a primary driven gear 143 provided at the right end of the main shaft 138 and engaging a primary driving gear 142 fixed to the crankshaft 81, a clutch mechanism 144 provided on the right end of the main shaft 138, and a clutch releasing mechanism 145 having a member axially slidably inserted in the main shaft 138 to operate the clutch mechanism 144.

The bores of the main shaft 138 and the countershaft 139 serve as oil feed passages 146 and 147. The main shaft 138 and the countershaft 139 are provided with radial oil passages 148 and 149 communicating with the oil feed passages 146 and 147, respectively, to lubricate the gears 140a to 140f and 141a to 141f, and the clutch mechanism 144.

The power of the engine 8, namely, the rotation of the crankshaft 81 is transmitted through the primary driven gear 143 and the clutch mechanism 144 to the main shaft 138 of the transmission 131, from the main shaft 138 through the gears 140a to 140f and the gears 141a to 141f to the countershaft 139, and then from a driving sprocket 150 fixed to the left end of the countershaft 139 through the driving chain 45 to the rear wheel 7.

The primary driven gear 143 consists of a main gear 143a and a secondary gear 143b, which are able to turn relative to each other. The turning of the main gear 143a and the secondary gear 143b relative to each other is limited to a predetermined angular range by damping springs 151. Thus, the backlash between the primary driving gear 142 and the primary driven gear 143 is eliminated. The primary driven gear 143 is supported by a sleeve 152 and a needle bearing 153 on the main shaft 138 for rotation relative to the same. An oil pump driving sprocket 154 is mounted on the sleeve 152 so as to rotate together with the primary driven gear 153. The oil pump driving sprocket 154 drives an oil pump 156, which will be described later, through a chain 155.

The clutch mechanism 144 will be described hereinafter. Referring to FIG. 7, the clutch mechanism 144 comprises a clutch drum 157 riveted to the primary driven gear 143, clutch hub 158 mounted on the main shaft 138 for rotation together with the same and disposed inside the clutch drum 157, friction plates 157a engaging the clutch drum 157, friction plates 158a engaging the clutch hub 158, and a pressure plate 159 for pressing together the friction plates 157a and 158a.

The pressure plate 159 is interlocked with the clutch hub 158 with bolts 160 for rotation together with the latter and is axially slidable on the main shaft 138. Normally, the pressure plate 159 is urged outward, to the right as viewed in FIG. 7, by clutch springs 161, in which the clutch mechanism 144 is engaged with the friction plates 157a and 158a are pressed together. When the pressure plate 159 is shifted to the right by the clutch releasing mechanism 145, the friction plates 157a and 158a are pressed together. When the pressure plate 159 is shifted to the right by the clutch releasing mechanism 145, the friction plates 157a and 158a are separated from each other to disengage the clutch mechanism 144.

The clutch releasing mechanism 145 comprises a releasing shaft 163 pivotally supported on a clutch cover 162, an operating rod 165 having a tip connected through a ball bearing 164 to the center of the clutch springs 161, a releasing lever 166 fixed to the lower end of the releasing shaft 163, and a return spring 167 for returning the releasing shaft 163 to its inoperative position. The releasing lever 166 is operated through a clutch wire, not shown, by a clutch lever 168 provided on the left bar of the bar handle 4.

When the clutch lever 168 is operated to pull the clutch wire, the releasing lever 168 turns the releasing shaft 163 to shift the operating rod 165 to the left, whereby the clutch mechanism 144 is disengaged.

The shifting mechanism 132 for changing the gear ratio of the transmission 131 will be described hereinafter. Referring to FIG. 7, the shifting mechanism 132 comprises a shifting spindle 169 journaled on a transmission case 133, a shifting drum 170 provided in its outer circumference with cam grooves 170a and journaled by ball bearing 171 on the transmission case 133, a shifting disk 172 fixed to one end of the shifting drum 170, provided on its end surface with radial shift pins 172 a and on its circumference with detaining recesses 172, a shifting plate 173 fixed to the right end of the shifting spindle 169 and provided at its extremity with a finger 173a that engage the shifting pin 172a, a stopper pate 174 fixed to the transmission case 133 and having an extremity that engages the detaining recess 172b of the shifting disk 1272 to stop the shifting drum 170 at a desired angular position, a shifting fork shaft 175 supported on the transmission case 133, and a plurality of shifting forks 176 (three shifting forks in this embodiment) mounted on the shifting fork shaft 175 for axial sliding movement thereon, and having ends engaging the cam grooves 170a of the shifting drum 170, and the other end engaging the gears 140a to 140f mounted on the main shaft 138, and the gears 141a to 141f mounted on the countershaft 139.

The shifting spindle 169, the shifting drum 170 and the shifting fork shaft 175 are parallel with the main shaft 138 and the countershaft 139 of the transmission 131.

A shifting pedal, not shown, is fastened by splines to one end of the shifting spindle 169 projecting from the transmission case 133 to turn the shifting spindle 16 through a fixed angle. The turning of the shifting spindle 169 is transmitted through the shifting plate 173 and the shifting disk 172 to the shifting drum 170, and then the shifting drum 170 moves the shifting forks 176 accordingly to shift the gears 140a to 140f and the gears 141a to 141f to change the gear ratio.

A sprocket cover 177 is fixed to the transmission case 133 to cover the driving sprocket 150 fixed to the left end of the countershaft 139. A backing plate 177b is fixed to the backside of the sprocket cover 177 by ultrasonic welding.

A lubricating unit 178 for lubricating the engine 8 and the transmission 131 is provided in the lower portion of the engine 8.

Figure 11:
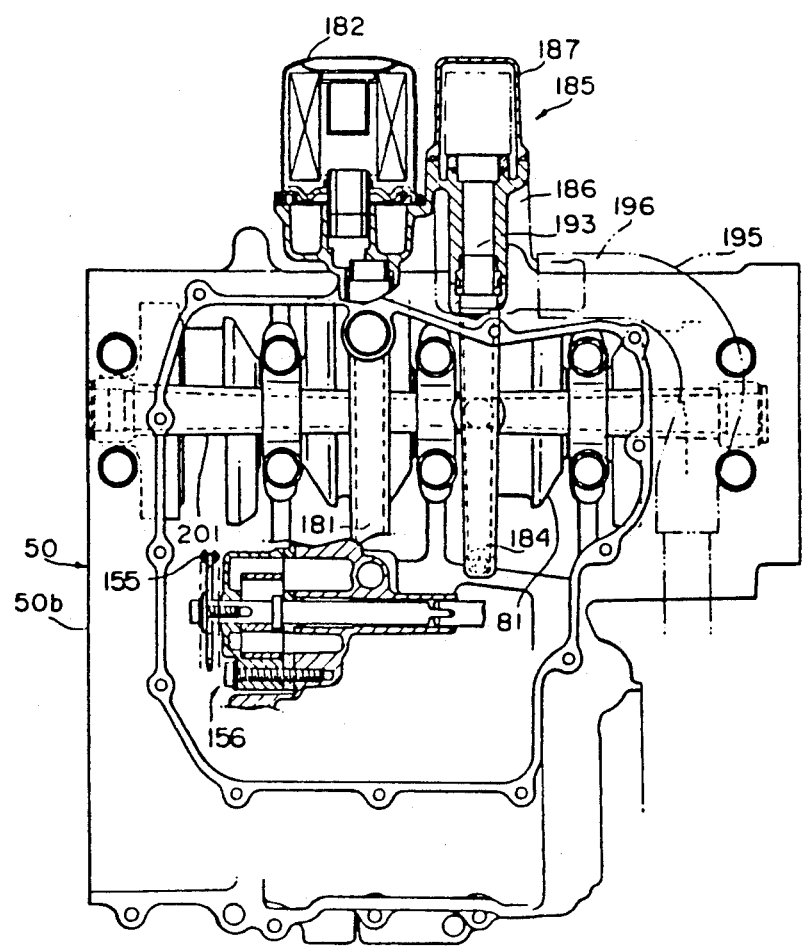
FIG. 11 is a partially sectioned bottom view of the engine.

Referring to FIGS. 5, 6 and 11, the lubricating unit 178 comprises the oil pan 75 joined to the lower end of the lower case 50b of the crankcase 50 and containing the lubricating oil L, an oil strainer 179 immersed in the lubricating oil L, the oil pump 156 disposed within the crankcase 50 and connected to the oil strainer 179 by a pipe 180, an oil filter 182 fixed to the front wall of the crankcase 50 and connected to the oil pump 156 by a first oil passage 181, and a pressure relief valve 183 provided in the first oil passage 181 and immersed in the lubricating oil L.

As mentioned above, the oil pump 156 driving through the chain 155 and the oil pump driving sprocket 154 by the main shaft 138 while the engine 8 is in operation to suck the lubricating oil L through the oil strainer 179 and pumps the same through the first oil passage 181 into the oil filter 182. The lubricating oil L filtered by the oil filter 182 flows through a cooling case 185 fixed to the front wall of the lower case 50b into a second oil passage 184 formed in the lower case 50b n parallel to and on the left side of the first oil passage 181. The cooling case 185 cools the lubricating oil L.

As shown in FIGS. 12 to 15, the cooling case 185 comprises an elongate case body 186 disposed adjacent to the oil filter 182 and fixed to the crankcase 50 in a vertical position, and a cover 18 closing the open front end of the case body 186.

As best shown in FIGS. 13 and 14, the case body 186 is provided with a flange 188a to which the cover 187 is joined, a flange 188b to which the oil filter 182 is joined, a first outlet opening 189 by means of which the first oil passage 181 communicates with the inlet side of the oil filter 182, a first inlet opening 190 opening into the outlet side of the oil filter 182, a first oil pipe 192 having one end connected to the first inlet opening 190 and the other end connected to a second outlet opening 191 opening in the front surface of the case body 186 and, extending obliquely upward from the first inlet opening 190 to the second outlet opening 191, a second inlet opening 193 opening into the second oil passage 184, an opening 194 for cooling water formed in its upper portion, and a connecting pipe 196 attached to its lower end and connected to a water pipe 195.

The second outlet opening 191 and the second inlet opening 193 are connected by a second oil pipe 197 extending on the front surface of the case body 186 and having flanges 197a formed at its opposite ends and fastened to the case body 186 with screws.

The flanges 188a and 188b are provided with through holes 198 for fastening the case body 186 to the crankcase 50 with bolts, ad with threaded holes 199 for screwing bolts therein to fasten the cover 187 to the case body 186. The lowermost through hole 198 serves as a drain hole for draining water.

Figure 12:
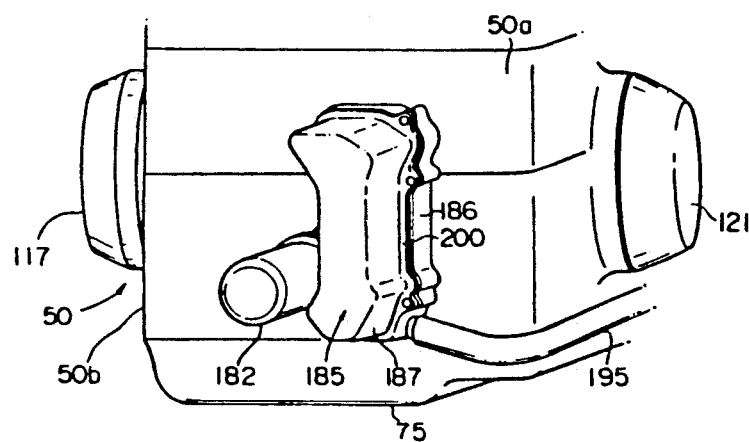
FIG. 12 is a perspective view of a front portion of the lower portion of the engine.
Figure 16:
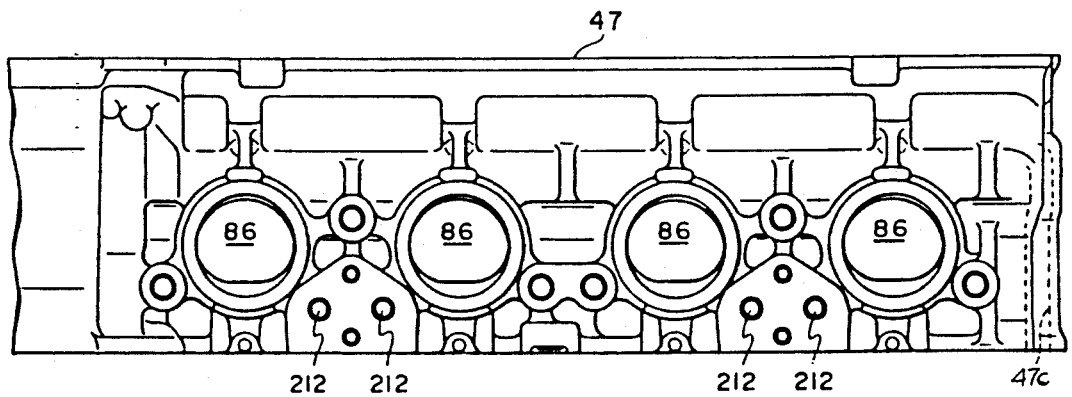
FIG. 16 is a side view of the head illustrating the exhaust passages.
Figure 17:
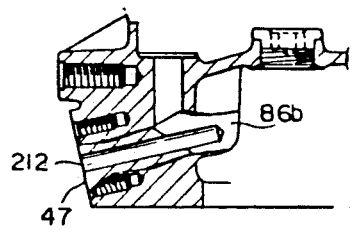
FIG. 17 is a fragmentary sectional view of the cylinder head.
Figure 18:
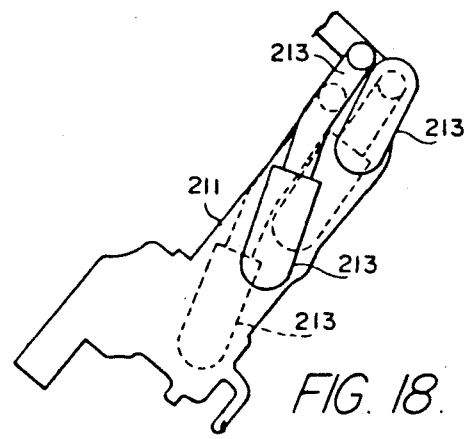
FIG. 18 is a side view of a reed valve employed with the present invention.
Figure 19:
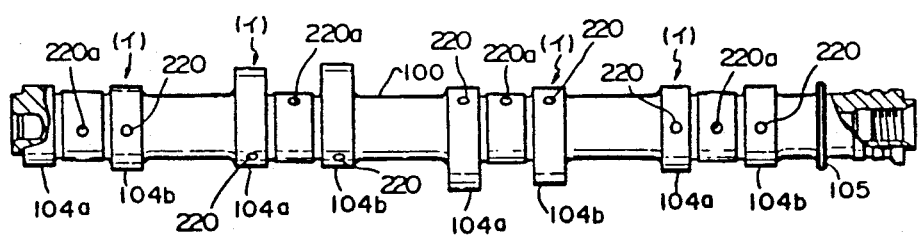
FIG. 19 is a plan view of an exhaust camshaft.
Figure 20:
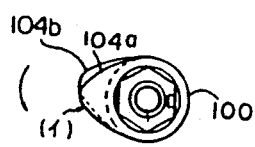
FIG. 20 is an end view of the exhaust camshaft.
Figure 21:
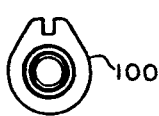
FIG. 21 is an end view of the exhaust camshaft taken from the opposite end to that of FIG. 20.
Figure 22:
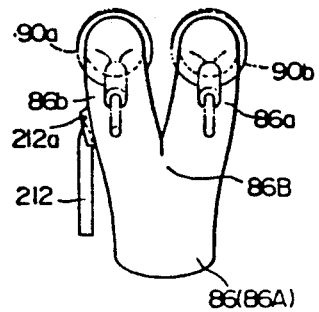
FIG. 22 is a schematic view of an exhaust passage.

As shown in FIG. 12, the cover 187 has a shape of a box conforming to the shape of the case body 186 and has a flange 200 joined to the flange 188b of the case body 186.

The flange 200 is provided with through holes, not shown, respectively corresponding to the through holes 198 and the threaded holes 199 formed in the flange 188b of the case body 186. Bolts, not shown, are inserted through the through holes of the cover 187 and screwed in the threaded holes 199 to fasten the cover 187 to the case body 187. Bolts, not shown, are inserted through the through holes of the cover 187 and the through holes 198 of the case body 186 and screwed in the crankcase 50 to fasten the cooling case 185 to the crankcase 50.

The lubricating oil L flows from the first oil passage 181 through the first outlet opening 189 into the oil filter 182. Then, the lubricating oil filtered by the oil filter 182 flows through the first inlet opening 190, the first oil pipe 192 and the second outlet opening 191 into the second oil pipe 197. then, the lubricating oil L flows down through the second oil pipe 197 and flows through the second inlet opening 193 into the second oil passage 184. Cooling water is supplied through the water pipe 195 into the cooling case 185 to cool the lubricating oil L flowing through the second oil pipe 197.

As best shown in FIG. 6, the lubricating oil L cooled while the same is flowing through the cooling case 185 is fed through the second oil passage 184 to the transmission 131 to lubricate the main shaft 138, the countershaft 139, the clutch mechanism 144 and the associated parts. The lower case 50b of the crankcase 50 is provided with a main gallery 201 connected to the second oil passage 184 and extending across the lower case 50b. The lubricating oil L is fed through the second oil passage 184 and the main gallery 201 to lubricate the components of the engine 8 including the crankshaft 81, the pistons 77, the camshafts 99 and 100 and the associated parts. In FIG. 6, indicated at 202 is an oil passage.

as shown in FIG. 6, the lubricating oil L flowing through the oil passage 202 is distributed to the chain tensioner 109 to operate the chain tensioner 109 hydraulically. An oil passage 203 is branched from the oil passage 202 and formed through the cylinder block 46 and the cylinder 111 of the chain tensioner 109 to apply the pressure of the lubricating oil L to the plunger 112 so that the lunger 112 is urged continuously toward the tension slipper 110.

The lubricating oil L is thus circulated for lubrication, returns into the oil pan 75, and then the lubricating oil L is circulated again through the foregoing oil passages.

The pressure of the lubricating oil L circulating through the engine 8 and the transmission 131 increases with the operating speed of the engine 8 (the rotational speed of the crankshaft 81). If the pressure of the lubricating oil L has increased beyond a predetermined value, the pressure relief valve 183 (FIGS. 5 and 6) opens to return the lubricating oil L from the first oil passage 181 directly into the oil pan 75 so tat the pressure is regulated below the predetermined value.

The pressure relief valve 183 comprises a bottomed cylinder 204 communicating with the first oil passage 181 and provided with a discharge port 204a in its side wall, a piston 206 axially slidably fitted in the cylinder 204 and normally closing the discharge port 204a, and a spring 205 extended between the bottom wall of the cylinder 204 and the piston 206 to urge the piston 206 so that the discharge port 204a is closed by the piston 206. If the pressure of the lubricating oil in the first oil passage 181 increases beyond the predetermined value, the piston 206 is moved against the resilient force of the spring 205 to open the discharge port 204a and, consequently, the lubricating oil L is discharged from the first oil passage 181 through the discharge port 204a into the oil pan 75.

The engine cooling system including the radiator 9 will briefly be described with reference to FIGS. 5, 6 and 10.

A water pump 207 is disposed in the lower case 50b of the crankcase 50 at a position substantially ont he left side of the middle portion of the lower case 50b. The water pump 207 is driven by the crankshaft 81. The water pump 207 is connected to the outlet tank 9a of the radiator 9 by a radiator hose 208 and to the cooling case 185 by the water pipe 195. The interior of the cover 187 of the cooling case 185 communicates with a water jacket 46a formed in the cylinder block 46 by means of the opening 194 formed in the case body 186.

The cylinder head 47 is provided with a water jacket 47a so as to communicate with the water jacket 4a of the cylinder block 46. As shown in FIG. 10, the water jacket 47a communicates with a cooling water passage 209 formed in the rear right-had end of the cylinder head 47. A thermostat 209a is provided in the cooling water passage 209. The radiator fan 9A is actuated when the temperature of the cooling water flowing through the cooling water passage 209 exceeds a predetermined temperature. The cooling water passage 209 is connected to the inlet tank, not shown, of the radiator 9 by a radiator hose, not shown.

The cooling water cooled in the radiator 9 and pumped by the water pump 207 flows through the radiator 9, the radiator hose 208, the water pump 207, the water pipe 195, the cover 187 of the cooling water case 185, and the water jackets 46a and 47a to coo the lubricating oil L in the cooling water case 185 and to cool the engine 8 in the water jackets 46a and 47a, and returns through the cooling water passage 209 into the radiator 9.

A secondary air feed device 210 in accordance with the present invention for feeding secondary air not the exhaust gas will be described hereinafter with reference to FIGS. 8, 9 and 15 to 26.

The secondary air feed device 210 comprises a reed valve 211 disposed on the front end of the engine 8 and connected to the outlet side of the air cleaner 54 by a secondary air feed pipe, not shown, a secondary air feed passage 212 connected to either the branch passage 86a or 86b of the exhaust passage 86 for each cylinder 5, and connecting pipes 23 connecting the secondary air feed passages 212 to the outlet side of the reed valve 211. The secondary air feed passages 212 for the first cylinder 51a and the third cylinder 51c open in the front surface of the cylinder head 47 and are connected respectively tot he right-hand branch passages 86b, and the secondary air feed passages 212 for the second cylinder 51b and the fourth cylinder 51d opens in the front surface of the cylinder block 46 and are connected respectively to the left-hand branch passages 86a. The connecting pipes 213 are connected respectively to the open ends of the secondary air feed passages 212. Each secondary air feed passage 212 is substantially perpendicular to the front surface of the cylinder head 47, and opens into a recess 212a formed in the side surface of the corresponding branch passage 86a or 86b.

The reed valve 211 is provided internally with passages, not shown, connected respectively to the connecting pipes 213, and with valve elements, not shown, respectively for the passages. When the exhaust gas produced in the combustion chamber 83 flows through the exhaust passage 86 while the engine 8 is in operation, a negative pressure is created in the secondary air feed passage 212 and the connecting pipe 2113, and consequently, the corresponding valve element is opened to allow air (secondary air) to flow from the air cleaner 54 through the secondary air feed pipe, the reed valve 211, the connecting pipe 213 and the secondary air feed passage 212 into the corresponding branch passage 86a or 86b.

The exhaust camshaft 100 of the engine 8 in this embodiment is provided with the two exhaust cams 104a and 104b respectively for the two exhaust valves 90a and 90b for each cylinder 51, and the two exhaust cams 104a and 104b are formed so that the opening point of the exhaust valve 90a (90b) associated with the branch passage 86a (86b) connected to the secondary air feed passage 212 is slightly earlier than the opening point of the other exhaust valve 90b (90a) associated with the branch passage 86b (86a) not connected to the secondary air feed passage 212.

That is the cam position of the exhaust cam 104a (104b) for opening the exhaust valve 90a (90b) is advanced by a small angle, for example, an angle in the range of 2° to 3°, relative to that of the other exhaust cam 104b (104a) with respect to the rotating direction of the exhaust camshaft 100. The advanced exhaust cams 104a and 104b are indicated at a in FIGS. 19 and 20. Accordingly, the exhaust gas is discharged from the combustion chamber 83 first into the branch passage 86a (86b) connected to the secondary air feed passage 212, and then into the other branch passage 86b (86a) with a delay.

Thus, while the engine 8 provided with the secondary air feed device 210 is in operation, a vacuum is created in the secondary air feed passage 212 and the connecting pipe 213 by the exhaust gas produced in the combustion chamber 83 and flowing through the exhaust passage 86, the corresponding valve element is opened by the vacuum, the secondary air flows from the air cleaner 54, the secondary air feed pipe, the reed valve 211, the connecting pipe 213 and the secondary air feed passage 212 into the branch passage 86a (86b).

The secondary air fed into the branch passage 86a (86b) interacts with the exhaust gas discharged into the branch passage 86a (86b) immediately after the exhaust gas has been discharged from the combustion chamber 83 to make the unburned gas contained in the exhaust gas burn (to be oxidized).

On the other hand, the unburned gas contained in the exhaust gas discharged into the other branch passage 86b (86a) not connected to the secondary air feed passage 22 mixes with the secondary air after passing the branching portion 86B. Since the branching portion 86B is heated by the heat generated by the burning of the unburned gas contained in the exhaust gas flowing through the branch passage 86a (86b), the unburned gas contained in the exhaust gas flowing through the branch passage 86b (86a) is able to burn even if the same is not mixed with the secondary air immediately after the same has been discharged from the combustion chamber 83 and mixed with the secondary air in the vicinity of the branching portion 86B. Consequently, the exhaust gas scarcely containing the unburned gas is discharged outside through the exhaust pipes 56 and the muffler 58.

The unburned gas contained in the exhaust gas discharged into both the branch passages 86a and 86b is caused to burn effectively by the secondary air so that the exhaust gas is purified at an improved efficiency.

Figure 23:
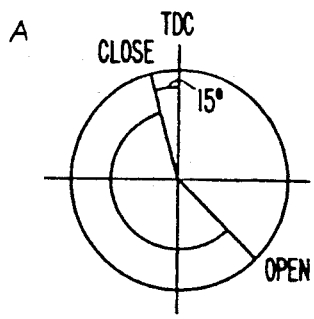
FIG. 23 is a timing diagram showing an optimum mode of controlling the exhaust valve for achieving a maximum exhaust gas purifying efficiency.
Figure 24:
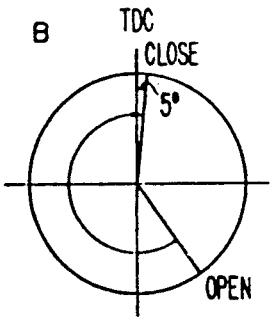
FIG. 24 is a timing diagram showing an optimum mode of controlling the exhaust valve for achieving maximum output characteristics.
Figure 25:
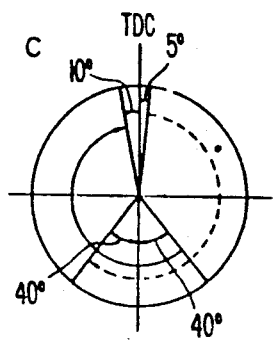
FIG. 25 is a timing diagram showing an ordinary mode of controlling an intake valve and a corresponding exhaust valve.
Figure 26:
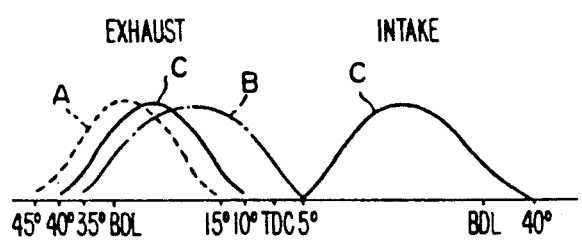
FIG. 26 is a diagram comparatively showing the variation of the lifts of the intake valve and the exhaust valve with time.

FIG. 23 shows an exhaust valve control mode A in which the exhaust gas purifying efficiency is a maximum, FIG. 24 shows an exhaust valve control mode B in which the output of the engine 8 is a maximum, and FIG. 25 shows an ordinary exhaust-intake valve control mode C in which the exhaust gas purifying efficiency is sacrificed slightly to enhance the output, and the output is sacrificed slightly to enhance the exhaust gas purifying efficiency. FIG. 26 shows comparatively the variation of the respective lifts of the exhaust valve and the intake valve with time in the exhaust valve control modes A and B and the exhaust-intake valve control mode C.

The engine is able to operate at an optimum exhaust gas purifying efficiency and in optimum output characteristics if the angular positions of the exhaust cams 104a and 104b are determined so that the exhaust valve 90a (90b) corresponding to the branch passage 86a (86b) connected to the secondary air feed passage 212 is controlled in the exhaust valve control mode A, and the other exhaust valve 90b (90a) is controlled in the exhaust valve control mode B.

Figure 28:
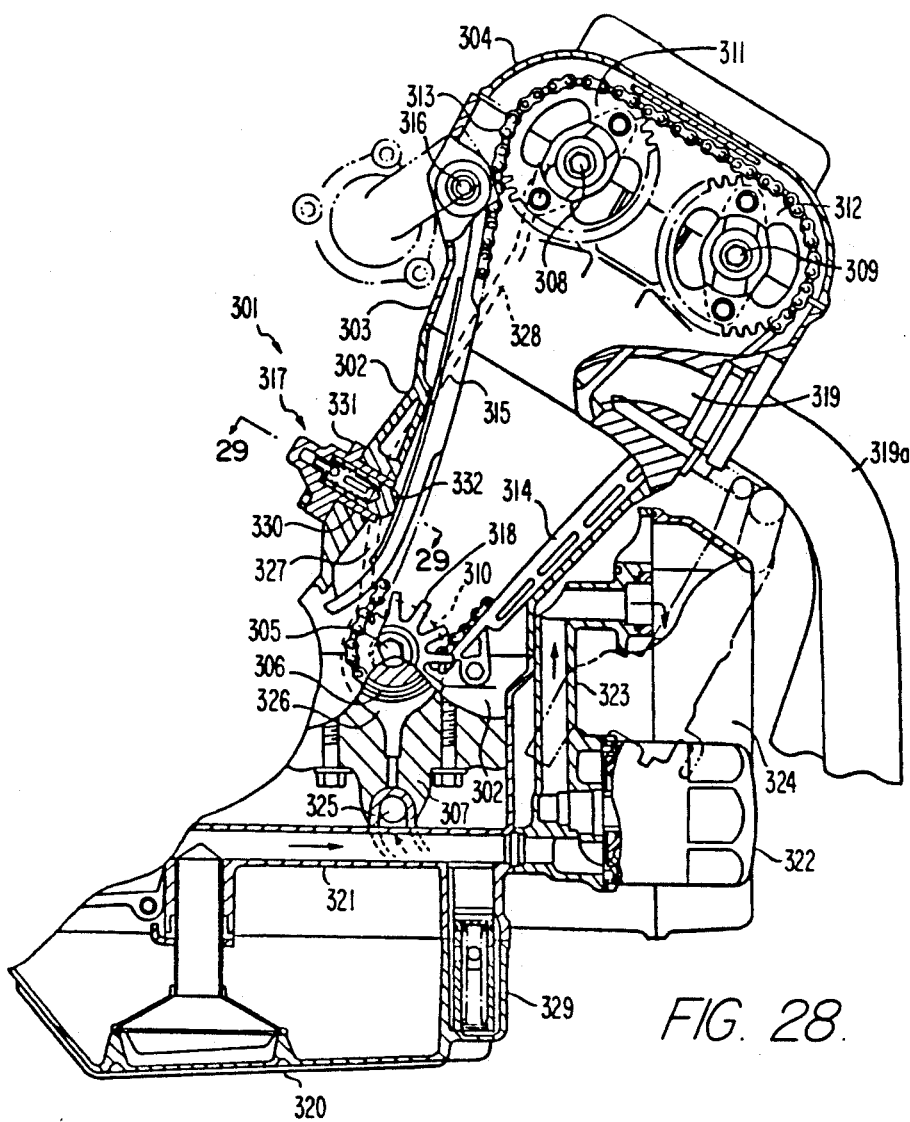
FIG. 28 is a sectional view of an oil feed passage structure and a preferred embodiment according to the present invention.

An oil feed structure for the cylinder 111 of the chain tensioner 109 is described in FIGS. 28 through 32. Referring to FIG. 28, there are shown an engine 301, a lower case 302, an upper case 303, a head cover 304, a crankshaft 305 supported on bearings 306 held between the lower case and bearing caps 307, and camshafts 308 and 309 journaled between the upper case 303 and the head cover 304.

A timing chain 313 is wound around a sprocket 310 attached to the crankshaft 305, and sprockets 311 and 312 attached respectively to the camshafts 308 and 309. A chain guide 314 guides the tight side of the timing chain 313, and a slipper 315 presses the slack side of the timing chain 313 to take up slack in the timing chain 313. The slipper 315 is supported pivotally at its one end on a pin 316, and a hydraulic chain tensioner 317 applies pressure to the slipper 315. Also shown in FIG. 28 are a trigger 318 for generating pulses at a rate corresponding to the rotating speed of the crankshaft 305, an exhaust port 319, and exhaust pipes 319a.

An oil pump, not shown, pumps lubricating oil for lubricating the engine from an oil pan 320 and sends the same through a pipe 321, an oil filter 322, a pipe 323, an oil cooler 324, and a pipe extended in a plane including the pipe 321 into a main gallery 325. Then, the oil flows through a sectorial passage 326 having a small depth and a passage 327 formed in the wall of the lower case 302 into the hydraulic chain tensioner 317, and then flows through a passage 328 into camshaft bearings. The pressure of the lubricating oil is regulated by a relief valve 329 provided in the pipe 321.

Figure 29:
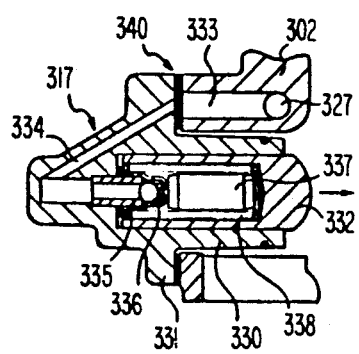
FIG. 29 is a sectional view taken along line 29—29 of FIG. 28.

Referring to FIG. 29, the chain tensioner 317 has a cylinder 330 provided with a flange 331 fastened to the lower case 302. A plunger 332 is fitted in the cylinder 330. The lubricating oil flows through a passage 333 branching from the passage 327, and a passage formed through the flange 331 into the cylinder 330 to apply pressure to the plunger 332. Also shown in FIG. 29 are a check valve 335, a valve spring 336, a float 337, and a compression coil sprint 338 biasing the plunger 332 outward.

Figure 30:
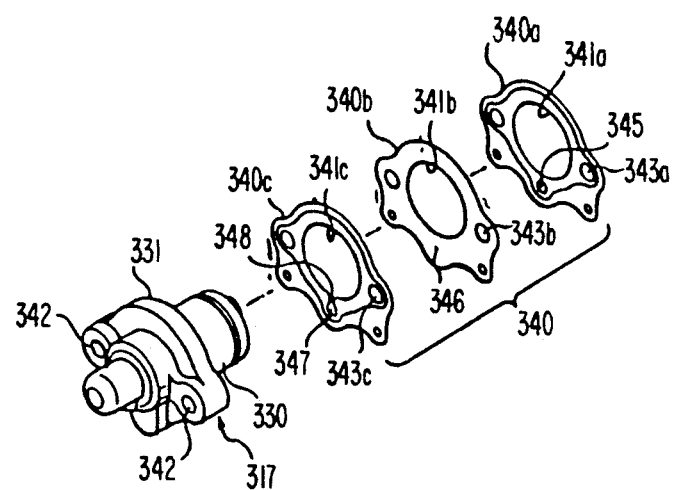
FIG. 30 is an exploded perspective view of an orifice assembly of the oil feed passage structure.

A gasket 340 is inserted between the joining surfaces of the flange 331 and the lower case 302. As shown in FIG. 30, the gasket 340 comprises three metal sheets 340a, 340b and 340c. The metal sheet 340a and 340c are formed of a stainless steel, and the metal sheet 340b is formed of aluminum. The metal sheets 340a, 340b and 340c are provided with holes 341a, 341b and 341c for receiving the cylinder 330, and bolt holes 343a, 343b and 343c corresponding to the bolt holes 342 of the flange 331, respectively. The metal sheets 340a, 340b and 340c are fastened together with rivets.

The metal sheet 340a is provided with a hole 345 having a diameter slightly smaller than that of the passage 333 at a position corresponding to the junction of the passages 333 at a position corresponding to the unction of the passages 333 and 334. The metal sheet 340b is provided with an orifice 346 of a diameter, for example, of 0.8 mm. The metal sheet 340c is provided with a hole 347 of a diameter equal to that of the hole 345, and a slit extending between the hole 347 and the hole 341c to define a leak groove 348. The diameter of the holes 345 and 347 are greater than that of the orifice 346 and is determined selectively so that the holes 345 and 347 can easily be formed by pressing.

Figure 31:
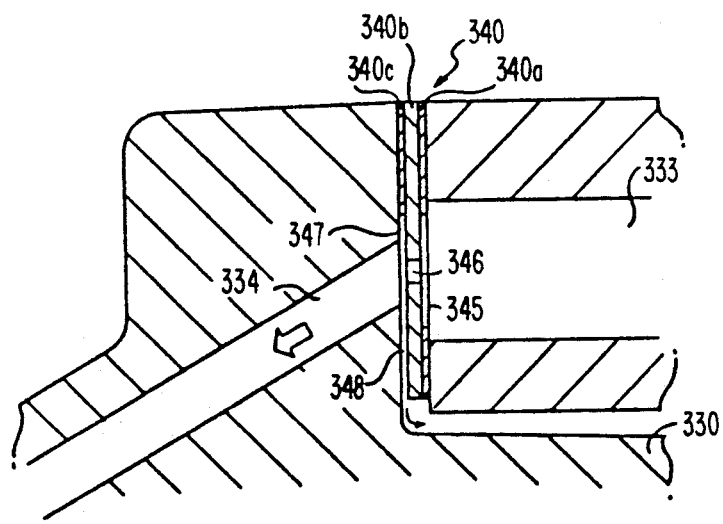
FIG. 31 is an enlarged sectional view of the assembled orifice structure.
Figure 32:
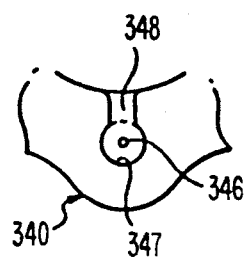
FIG. 32 is a partial front view of the orifice structure.

When the metal sheets 340a, 340b and 340c are fastened together, the leak groove 348 of a small depth corresponding to the thickness of the metal sheet 340c is formed after the orifice 346 with respect to the flowing direction of the lubricating oil as shown in FIGS. 31 and 32. The holes 345 and 347 can be formed in a process of forming the metal sheets 340a and 340c, the orifice 346 can very easily be formed in the metal sheet 340b formed of aluminum by pressing, and the slit defining the leak groove 48 can easily be formed. Naturally, the hole 347 and the slit defining the leak groove 348 may simultaneously be formed in forming the metal sheet 340c by pressing.

The flow rate of the lubricating oil fed through the passage 333 is restricted by the orifice 346 and part of the lubricating oil leaks through the leak groove 348, so that the lubricating oil of a reduced pressure acts on the plunger 32. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A water cooled oil cooling device for the engine of a vehicle comprising
   a base fixed to the engine;
   an oil filter;
   a water cooled oil cooling unit displaced from said filter, said oil filter and said water cooled oil cooling unit being mounted on said base, said base including an oil passage between said oil filter and said water cooled oil cooling unit.

2. The water cooled oil cooling device according to claim 1 wherein said water cooled oil cooling unit has the shape of a vertically elongate, rectangular box.

3. A water cooled oil cooling device according to claim 1 wherein the direction of flow of cooling water in said water cooled oil cooling unit is reversed to that of the oil.

4. The water cooled oil cooling device according to claim 1 wherein said water cooled oil cooling unit includes a case body and a cover member.

5. The water cooled oil cooling device according to claim 1 wherein the cooling water flows directly into the engine after flowing through the water cooled oil cooling unit.

6. The water cooled oil cooling device according to claim 1 wherein said oil filter is detachable from said base independently of the water cooled oil cooling unit.

7. The water cooled oil cooling device according to claim 1 wherein said water cooled oil cooling unit includes a drainage for draining water from the water cooled oil cooling unit.

* * * * *